United States Patent [19]

Schotten

[11] 4,196,084
[45] Apr. 1, 1980

[54] PLATE FILTER PRESS

[75] Inventor: Alfons Schotten, Düren, Fed. Rep. of Germany

[73] Assignee: Eberhard Hoesch & Söhne GmbH & Co., Düren, Fed. Rep. of Germany

[21] Appl. No.: 834,447

[22] Filed: Sep. 19, 1977

[30] Foreign Application Priority Data

Sep. 21, 1976 [DE] Fed. Rep. of Germany ....... 2642357

[51] Int. Cl.² ............................................. B01D 25/00
[52] U.S. Cl. ................................................. 210/224
[58] Field of Search .................... 100/46, 258, 258 A, 100/269, 295; 210/224; 308/72

[56] References Cited

U.S. PATENT DOCUMENTS

| 2,350,795 | 6/1944 | Monier | 100/46 |
|---|---|---|---|
| 2,565,639 | 8/1951 | Waldie | 100/269 |
| 2,859,591 | 11/1958 | Zimmerman | 100/46 |
| 2,915,961 | 12/1959 | Parkinson | 100/46 |
| 3,023,424 | 11/1961 | Busse et al. | 210/224 |
| 3,059,431 | 10/1962 | Munschauer, Jr. et al. | 100/46 |
| 3,070,146 | 12/1962 | Ferranti | 100/46 |
| 3,120,799 | 2/1964 | Strnad et al. | 100/46 |
| 3,523,444 | 8/1970 | Lucky | 100/269 R |
| 3,562,155 | 2/1971 | Rademacher et al. | 210/224 |
| 3,590,581 | 7/1971 | Bianchi et al. | 100/269 R |
| 3,762,906 | 10/1973 | Dahlman et al. | 100/269 R |
| 3,888,168 | 6/1975 | Kent et al. | 100/269 R |
| 4,072,372 | 2/1978 | Korrenn | 308/72 |

Primary Examiner—Theodore A. Granger
Attorney, Agent, or Firm—Spencer & Kaye

[57] ABSTRACT

A plate filter press has a plurality of filter plates forming a filter plate stack having opposite ends; an overhead guide carrier supporting the filter plates for individual displacement thereof in a direction parallel to the longitudinal axis of the plate filter press; a longitudinally displaceable head plate arranged at one end of the filter plate stack and having a support face arranged for engaging face-to-face the filter plate stack; an end plate arranged at the other end of the filter plate stack and unshiftably supported on the guide carrier; a power device attached to the head plate; and pull rods attached to the end plate and to the power device for urging, by the power device, the end plate and the head plate towards one another for pressing the filter plates to one another in the closed state of the plate filter press. The support face of the head plate is guided for an axially parallel displacement thereof and further, the end plate is swivelably secured to the guide carrier and the pull rods by spherical bearings.

7 Claims, 8 Drawing Figures

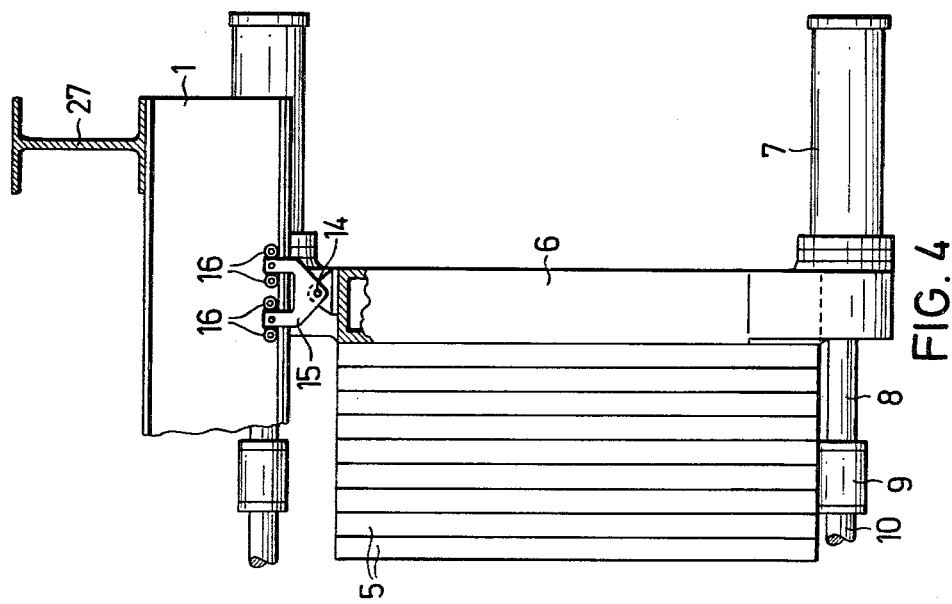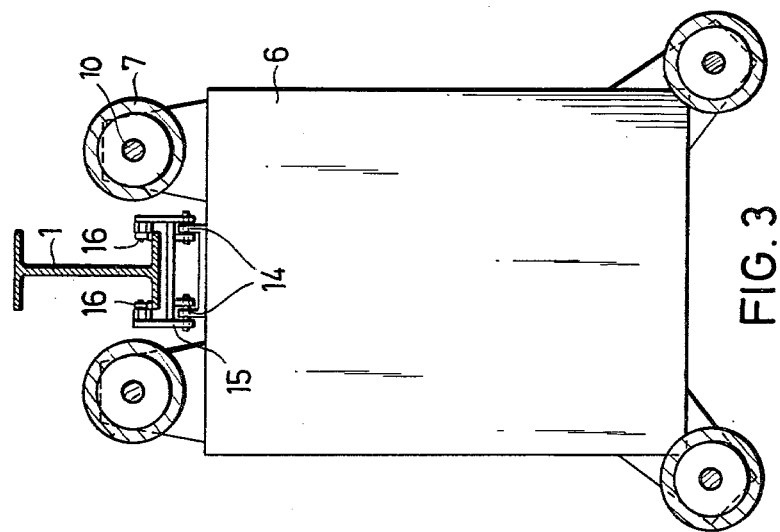

PLATE FILTER PRESS

BACKGROUND OF THE INVENTION

This invention relates to a plate filter press having a guide carrier which supports the filter plates, a non-shiftable end plate backed by the machine frame against the closing force exerted thereon by pull rods and a longitudinally displaceable head plate which is connected with a power device (hydraulic closing device) operating the pull rods. The filter plates are situated between the end plate and the head plate.

In German Utility Model Pat. (Gebrauchsmusterschrift) No. 6,803,483, to which corresponds U.S. Pat. No. 3,562,155, there is described a plate filter press in which the hydraulic closing device operates a closing yoke which is connected by pull rods with a displaceable pressure plate. The filter plate stack formed of the individual filter plates is pressed by the pressure plate against a rigid backup face of the machine frame. It is a result of this arrangement that in case the filter plate stack is pressed into engagement with the backup face (end plate) in such a manner that the filter plates are not exactly parallel to one another, unavoidable transverse forces are generated. This is so, because all the filter plates have to shift with respect to one another with the exception of the pressure plate which is articulated to the pull rods. These shifting forces are proportionate to the frictional forces between the filter plates. The frictional forces can be very high, dependent upon the degree of soiling, the properties of the slurry material, the properties of the filter cloth as well as the filter plate material. Since the power cylinder of the closing device is centrally secured to that side of the end plate which is oriented away from the filter plate stack, the reaction force of the power cylinder too, is applied centrally to the press stand (an integral part of which constitutes the end plate). Since the filter plates are supported on the press stand by guide elements which are, for each plate, arranged overhead above the plates and accordingly, frictional forces opposite the reaction force are generated, the filter plate stack, during each closing step, first engages the lower portion of the end plate forming part of the press stand. Thus, the filter plate stack, during each closing operation, automatically assumes the shape of an oblique parallelogram, so that the above-discussed disadvantageous displacements occur during each closing operation. Further, in the closed state of the press, a bending moment is likely to be exerted on the press stand. Such bending moment is then transmitted to the foundation (anchor) of the stand component which forms the end plate. Such an effect can be compensated for only by additional expensive features in the structure of the press stand.

SUMMARY OF THE INVENTION

It is an object of the invention to provide an improved plate filter press from which the above-discussed disadvantages are eliminated.

This object and others to become apparent as the specification progresses, are accomplished by the invention, according to which, briefly stated, the plate filter press has a plurality of filter plates forming a filter plate stack having opposite ends; an overhead guide carrier supporting the filter plates for individual displacement thereof in a direction parallel to the longitudinal axis of the plate filter press; a longitudinally displaceable head plate arranged at one end of the filter plate stack and having a support face arranged for engaging face-to-face the filter plate stack; an end plate arranged at the other end of the filter plate stack and unshiftably supported on the guide carrier; a power device attached to the head plate; pull rods attached to the end plate and to the power device for urging, by the power device, the end plate and the head plate towards one another for pressing the filter plates to one another in the closed state of the plate filter press; and a stationary support for backing up the head plate when a closing force is exerted by the power device. The support face of the head plate is guided for an axially parallel displacement thereof and further, the end plate is swivelably secured to the guide carrier and the pull rods by spherical bearings.

The above arrangement is advantageous in that during the closing motion of the filter press, the individually suspended filter plates supported by the guide carrier may lie against the support face of the head plate without a subsequent change in the angular position of the head plate and thus without an oblique parallelogram-like alignment of the filter plate stack. By virtue of the fact that, according to the invention, the support face of the end plate can change its inclination to the vertical and can furthermore turn about an axis of the end plate (which axis lies in the end plate), but is, at the same time, connected with the pull rods by means of spherical bearings, the end plate, when the filter plate stack eventually arrives into engagement therewith, can adjust itself according to the orientation of that filter plate of the filter plate stack which is the last one to arrive into pressing engagement. As a result, transverse motions of the individual filter plates with respect to one another during application of the full closing pressure practically no longer occur. By virtue of the fact that the end plate, the head plate and the filter plates are suspended from the overhead guide carrier the pull rods transmitting the closing forces are not stressed by an additional load derived from weight.

In accordance with an advantageous feature of the invention, the closing device has at least three, but preferably four hydraulic cylinders which are fixedly connected with the displaceable head plate and further, the pistons of the individual hydraulic cylinders are each connected with a separate pull rod. This arrangement is advantageous in that the sealing forces applied by the closing device are uniformly distributed along the perimeter of the individual filter plates even in case of filter plate stacks in which the two opposite contact faces of the filter plate stack do not extend parallel to one another.

According to a further advantageous feature of the invention, the center of the end plate bearing connected with the guide carrier and the center of each pull rod bearing are disposed in a single plane, preferably in a vertical plane containing the center of gravity of the end plate. As a result of this arrangement, during pivotal and rotary motions of the end plate during the engagement with the filter plate stack, the axial displacement of the pull rods is so small that no bending forces can be exerted thereon. In this arrangement it is further expedient to provide that the pull rods are pressed against the spherical bearings of the end plate by spring bias. This ensures that even in case of small load, a centered relationship of the components is maintained.

In accordance with a further feature of the invention, the axis of the upper pull rod or the axes of the two upper pull rods are approximately coplanar with the guide track of the filter plates and/or the head plate on the guide carrier. This arrangement ensures that the frictional force which is to be overcome by the head plate during the closing operation and which affects the filter plate suspension at the guide carrier is transmitted to the filter plate stack in a practically torque-free manner and the closing operation may be terminated without a tilting of the filter plates.

In order to ensure that the pull rods are free from an additional transverse load, in accordance with a further feature of the invention, the head plate is articulated to a carriage which is displaceable on the guide carrier. This arrangement ensures that in case of inaccuracies of the guide track at the guide carrier, a compensation is provided in order to prevent the head plate from canting at the apertures provided for the pull rods.

In accordance with still another feature of the invention, the hydraulic power cylinders are interconnected by means of a conduit system constituting a closed circuit. Each cylinder is coupled to a pressure source through a control arrangement. During the closing operation, first the cylinders are supplied with an approximately identical volume flow by means of an automatically operating volume flow distributor and, upon reaching a predetermined pressure, the cylinders are supplied with an identical pressure via the closed circuit by means of a presettable switch valve. This arrangement has the advantage that the closing (and also the opening) of the press may be performed rapidly. Since, however, in the closed position, dependent upon the orientation of the two end faces of the filter plate stack relative to one another, the volumes of the hydraulic fluid required for the complete closing of the several cylinders differ, by virtue of switching over to a cylinder pressurization with the same pressure, the end plate may be adapted exactly to the position of the filter plate stack. As a result, the sealing edge of the filter plates are exposed on all sides to the same sealing force.

BRIEF DESCRIPTION OF THE DRAWINGS

FIG. 3 is a sectional view taken along line III—III of FIG. 1.

FIG. 4 is a fragmentary side elevational view (partially in section) of that part of the structure shown in FIG. 1 which is in the zone of the head plate.

DESCRIPTION OF THE PREFERRED EMBODIMENT

Figure 1:
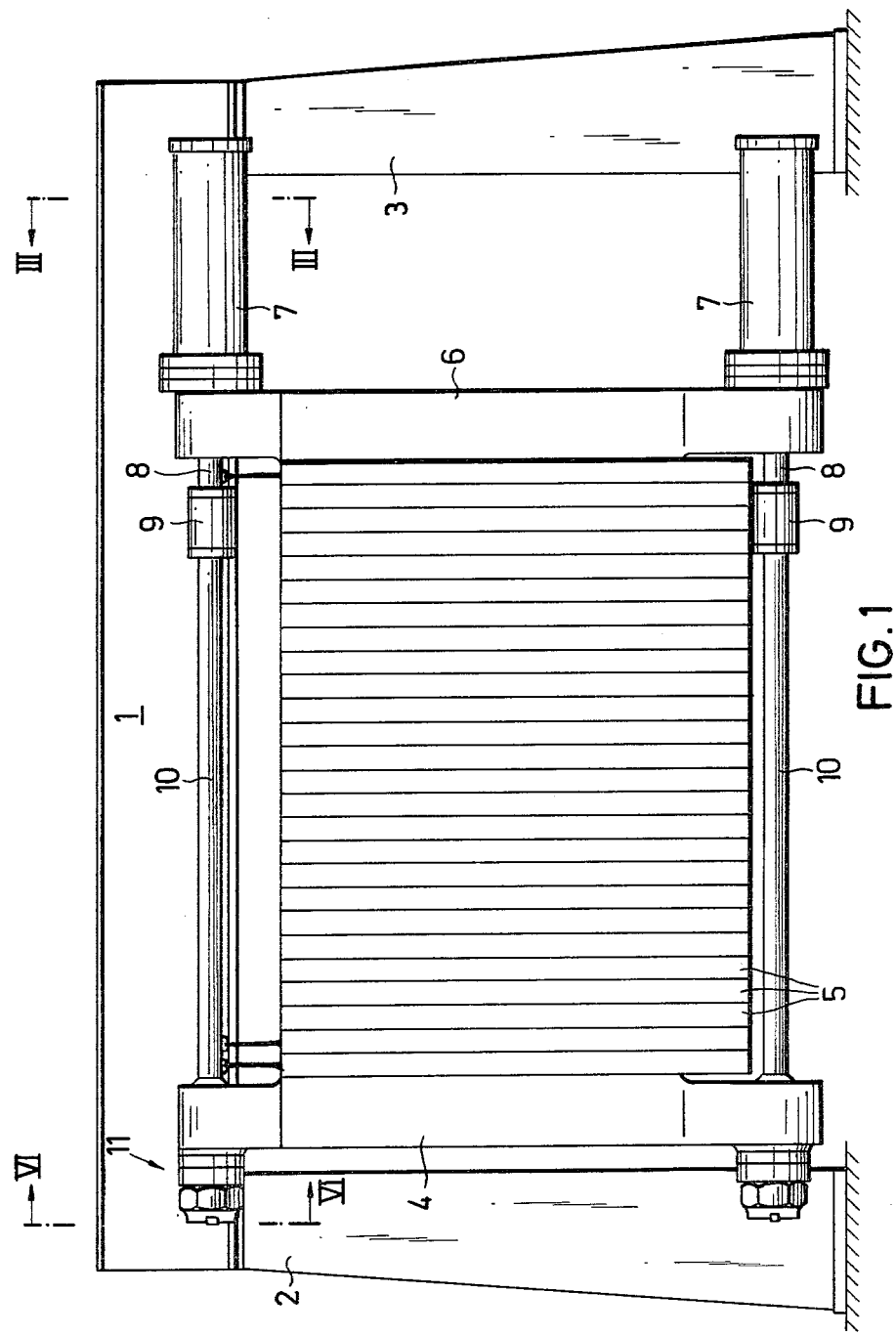
FIG. 1 is a side elevational view of a filter press incorporating a preferred embodiment of the invention.

Turning now to FIG. 1, there is illustrated, in side elevation, a plate filter press in the closed position. The filter press has a machine frame including a guide carrier 1 and uprights 2 and 3 standing on the floor and supporting the guide carrier 1 at its two ends. The guide carrier is, for example, a vertically oriented I-beam, from the lower flange of which there are suspended an end plate 4, a plurality of filter plates 5 as well as a head plate 6. The suspension of the end plate 4 at one end of the filter plates 5 and the suspension of the head plate 6 at the other end of the filter plates 5 will be discussed in detail later with reference to FIGS. 3 to 6. The filter plates 5 are suspended at the lower flange of the guide carrier 1 by means of suspensions of conventional structure for permitting a displacement of the filter plates 5 during the opening (and closing) of the filter plate press in the direction of the longitudinal axis of the press. For the sake of clarity, the suspensions of the filter plates 5 are not illustrated in detail in the Figures.

Figure 2:
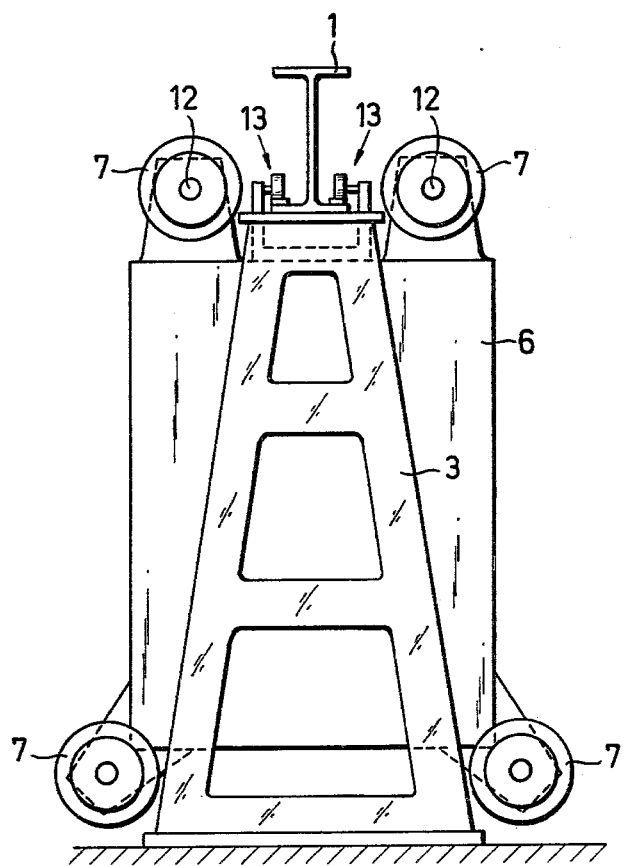
FIG. 2 is a front elevational view of the structure shown in FIG. 1.

Also referring to FIGS. 2 and 3, to the head plate 6 there are secured, in the corner zones thereof, four hydraulic cylinder-and-piston units 7, together constituting a power device. Each piston rod 8 of the respective power cylinder unit 7 is connected by means of a coupling 9 with a pull rod 10 which, in turn, is connected with the end plate 4 by means of a spherical bearing 11. The power cylinder units 7 are coupled through a control arrangement (to be discussed in detail later in connection with FIG. 8) to a hydraulic pressure source. Upon completion of the filtering process, the head plate 6 may be displaced from its closed position shown in FIG. 1 into the open position. For this purpose, the pull rods 10 are coupled with the end plate 4, so that they are practically not displaceable in the longitudinal direction. By means of a conventional filter plate transport device (not illustrated), the filter plates are displaced in succession in the direction of the head plate 6 (which is then in its open position) for performing the required ejection of the filter cake and the washing and rinsing of the individual filter plates. Prior to initiating a new filtering process, the filter plates are again displaced by the hydraulic cylinders 7 with the intermediary of the head plate 6 against the end plate 4 and thus pressed with the required closing pressure against the end plate 4.

The positional relationship of the cylinders 7 (and thus the pull rods 10) particularly with respect to the guide carrier 1 may be well observed in FIGS. 2 and 3. Each pull rod 10 has a longitudinal axis 12. It is of significance that the longitudinal axes 12 of the two upper pull rods lie at least approximately in the same plane as the guide track for the guide 13 of the head plate 6. In the embodiment shown, the head plate 6 is suspended from a small carriage assembly which may be displaced on the lower flange of the guide carrier 1. The carriage assembly, as shown in more detail in FIGS. 3 and 4, comprises a carriage frame 15 which is pivotally connected at 14 with the head plate 6. The carriage assembly further comprises roller pairs 16 which are pivotally mounted on the frame 15 and which travel on the upper face of the lower flange of of the guide carrier (I-beam) 1. It is noted that in FIGS. 3 and 4, the upper front hydraulic cylinder is omitted for the sake of clarity.

Figure 5:
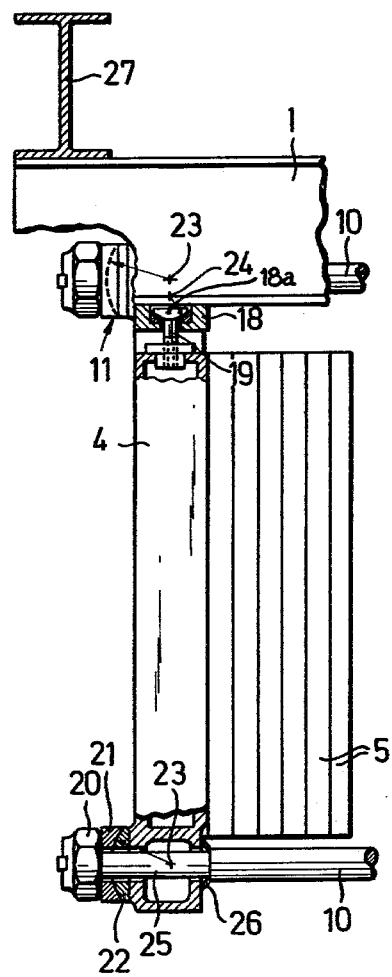
FIG. 5 is a fragmentary side elevational view (partially in section) of that part of the structure shown in FIG. 1 which is in the zone of the end plate.
Figure 6:
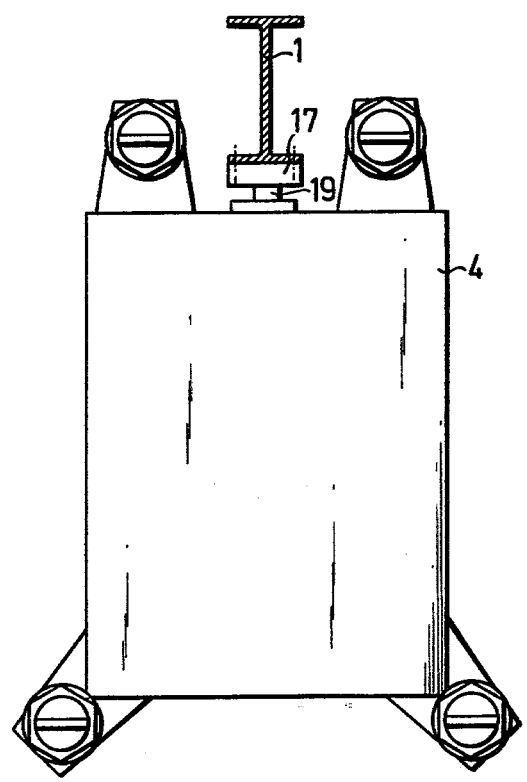
FIG. 6 is a sectional view taken along line VI—VI of FIG. 1.

As seen in FIG. 6, the stationary end plate 4 is connected with the guide carrier 1 by means of a bearing 17 which effects practically a one-point support of the end plate 4. The structure of the bearing 17 is seen in detail in FIG. 5. The bearing 17 is formed of a spherical bearing socket 18 which is connected with the guide carrier 1 and in which there is received the conformingly fitting head (ball) 18a of a support pin 19. This support arrangement permits, first, an all-directional pivotal motion of the end plate 4 to a limited extent about the center of the ball joint 18, 18a and, second, a rotary motion of the end plate 4 about the longitudinal axis of the pin 19.

The pull rods 10 are secured to the end plate 4 by means of nuts 20 with the intermediary of spherical bearings 11. Each spherical bearing 11, formed of two complemental, face-to-face engaging bearing shells 21 and 22 is arranged in such a manner that the centers of curvature 23 associated with the individual bearings 11 of the bearing shells and the center of curvature of the spherical bearing 17 of the end plate 4 all lie in the same plane. The centers of curvature 23 of the bearings 11 of the two upper pull rods, when viewed in the vertical direction, should preferably be disposed at least approximately at the height level as the center of curvature of the bearing 17 of the end plate 4.

FIG. 5 shows in section the spherical bearing 11 of the lower pull rod 10 in the end plate 4. The free end 25 of the pull rod 10 has a length portion of reduced diameter which passes through sufficiently wide aligned bores provided in the end plate 4 and in the bearing shells 21, 22 to ensure a certain relative swivel motion between each pull rod 10 on the one hand and the end plate 4, on the other hand. In order to further ensure that in case of only a slight pulling force or during the opening of the filter press, the two bearing shells 21 and 22 remain in contact with one another, the radially oriented shoulder provided between the normal and the reduced diameters of each pull rod 10 is engaged by a respective spring disc 26 which, in turn, is in contact with the inwardly oriented side of the end plate 4.

While the illustrations in FIGS. 3 and 6 correspond to the arrangement according to FIG. 1 regarding the support of the guide carrier 1, the illustrations according to FIGS. 4 and 5 show a suspended mounting for the guide carrier 1. In this arrangement the guide carrier 1 is attached to beams 27 which may form part of the building roof structure. As a result, the space underneath the plate filter press is unencumbered, thus permitting a free access of the transport devices (such as conveyor belts or the like) for removing the filter cakes.

Figure 7:
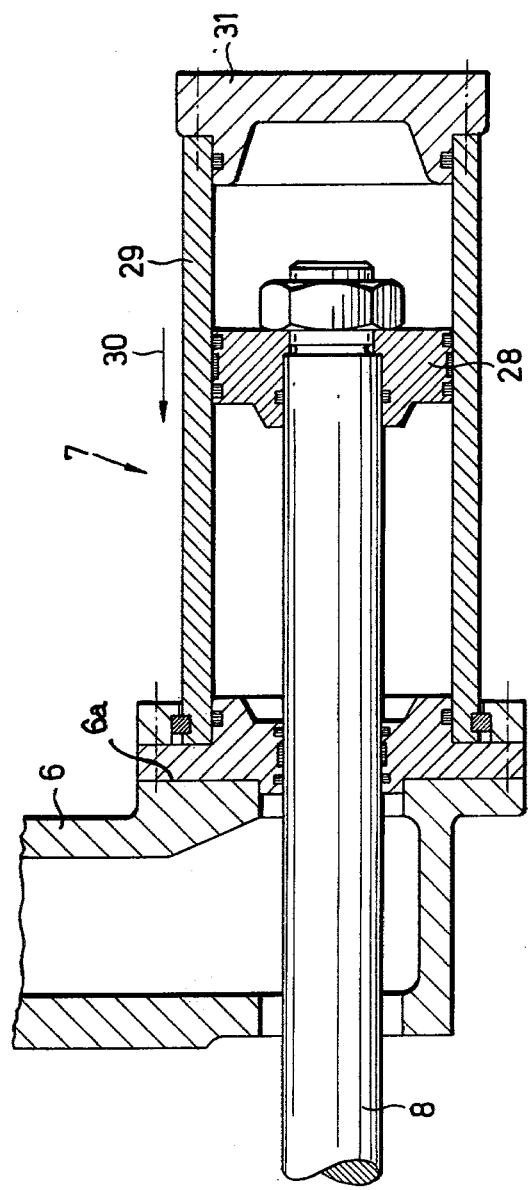
FIG. 7 is a longitudinal sectional view on an enlarged scale of a hydraulic cylinder forming part of the structure shown in FIG. 1.

FIG. 7 illustrates, in longitudinal section, one of the lower hydraulic cylinder units 7. From this Figure it will become apparent that the plate filter press structured according to the invention has advantages regarding the structure of the power cylinder units as well. Each power cylinder unit 7 is directly affixed to the head plate 6. The piston rod 8 coupled with the associated pull rod 10 is, during the closing of the press and during application of the closing pressure, exposed to tension. During these operations, the piston 28 of the unit 7 remains stationary, whereas the cylinder 29 is displaced, together with the head plate 6, in the direction of the arrow 30. This arrangement has the advantage that during the high closing pressures prevailing in the cylinder chamber, the closed cylinder base 31 is not exposed to pressure and thus the cylinder wall is not stressed by tension forces. The closing pressure prevailing in the rod-side cylinder chamber affects directly the base face 6a of the head plate, so that the cylinder wall is exposed only to the radially outwardly directed internal pressure. Only during the opening operation for which no high hydraulic forces are required, is the tubular body of the cylinder 29 exposed to pulling forces both at the cylinder base 31 and at its attachment to the head plate 6. This arrangement makes possible a lightweight dimensioning of the connection between the cylinder and the head plate and the connection between the cylinder base 31 and the tubular body of the cylinder 29.

Figure 8:
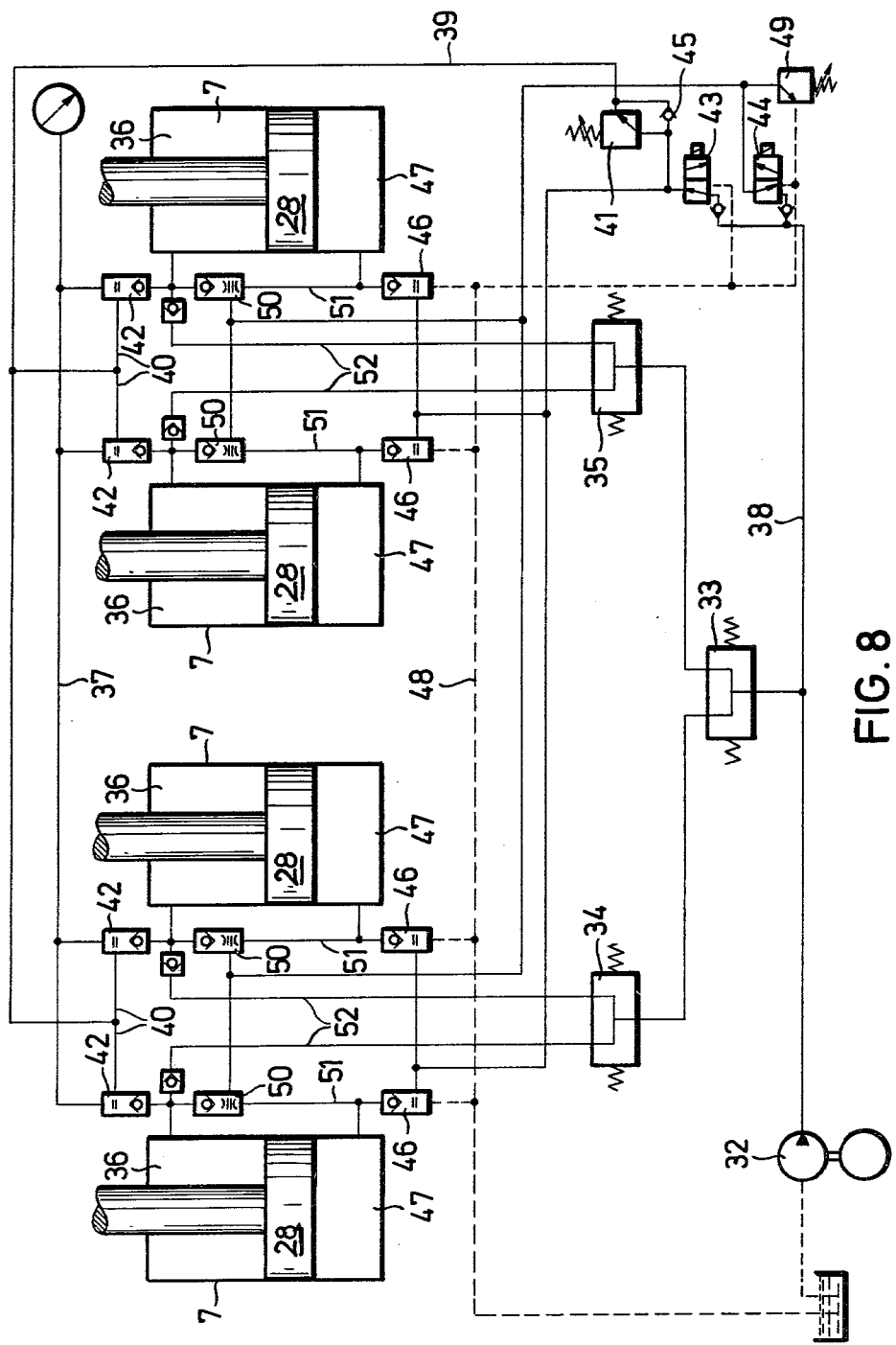
FIG. 8 is a hydraulic circuit diagram of the hydraulic control for the filter press closing device according to the invention.

Turning now to the hydraulic circuit diagram illustrated in FIG. 8, the four piston-and-cylinder units 7 are shown, for the sake of illustration, in a side-by-side relationship. By virtue of the circuit illustrated, the opening and the closing of the filter plate press may be effected rapidly. Furthermore, during the closing operation, an automatic switching operation is effected for applying the closing pressure. The hydraulic control is such that the hydraulic medium (such as oil) supplied under pressure by an oil pump 32 for the closing operation is, by means of automatically operating flow dividers 33, 34 and 35 divided into four equal flows introduced into the closing pressure chamber (rod-side chamber) of each cylinder unit 7. In this manner a rapid closing motion of the filter plate stack is ensured.

Since at the moment of engagement between the filter plate stack and the end plate 4 in case of an oblique positioning of the individual power cylinder units 7, the preceding piston strokes were different, but, since each pull rod has to exert the same force on the end plate 4, care has to be taken that from that moment on, all closing pressure chambers (rod-side chambers) 36 are charged with the same oil pressure. This is achieved by interconnecting all four cylinder units 7 with one another by a conduit 37. Further, there is provided a control conduit system 38, 39 branching off upstream of the pump 32. From the control conduit system 38, 39 there extend two supply conduits 40 to the shutoff valves 42 associated with each closing pressure chamber 36 of the cylinder units 7. In the control conduit system 38, 39 there is arranged a settable, automatically operating switch valve 41 which opens in response to a predetermined pressure, so that the control conduit 39 and thus the shutoff valves 42 associated with the connecting conduit 37 open. As a result, there is achieved an equalization of the oil volume to thus ensure that all cylinder units 7 are charged with the same oil pressure. Under these conditions the end plate 4 may adapt itself to the position of the plate filter stack, so that the sealing edge around the individual filter plates is exposed at all sides to the same sealing force.

The hydraulic circuit illustrated in FIG. 8 includes two solenoid valves 43 and 44 which, in their normal, de-energized state, are in the "close press" position. To initiate the filter press opening operation, the solenoid valves 43 and 44 are energized. As a result, through a check valve 45 arranged at a bias valve 41, the shutoff valves 42 of the connecting conduit 37 are switched off, so that the latter again assume their closed position. At the same time, the shutoff valves 46 which connect the opening pressure chamber (rear cylinder chamber) 47 of each cylinder unit 7 with a return conduit 48, are brought into their closed position. Upon energizing the hydraulic pump, oil is driven through the energized solenoid valves 43 and 44 to a further bias valve 49 which is set to a relatively low pressure. This pressure is always substantially lower than the hydraulic pressure prevailing in the closing pressure chamber 36 of the cylinder units 7. As a result, no further oil can flow into the closing pressure chambers 36; on the contrary, the entire pressurized oil flows through the bias valve 49 into the return conduit 48. The shutoff valves 50 which are arranged in a connecting conduit 51 extending from each closing pressure chamber 36 to the associated opening pressure chamber 47 are designed as pre-depressurizable shutoff valves. The pressure of the hydraulic fluid which is set at the bias valve 49 is then capable only to effect the preliminary unlocking of the shutoff valves. In this manner there is ensured a pressure equalization between the cylinder chambers 36 and 47 in each power cylinder unit 7, while the piston 28 moves slowly in the opening direction of the filter press. In this manner a depressurization (release) of the filter plate stack is effected slowly by the pull rods 10, so that no hydraulic impacts are imparted to the filter press stand. Only after the reduction of the pressure in the closing pressure chambers 36 can the full cross section of the pre-depressurizable shutoff valve 50 be made available to permit hydraulic oil—driven by the oil pump 32 and distributed into four equal volume parts by means of the flow dividers 33, 34 and 35—to flow into the cylinder chambers 36. Simultaneously, oil can also flow from the closing pressure chambers 36 into the opening pressure chambers 37 while the effective surface is merely the cross-sectional area of the piston rod. Since the quantity of the supplied oil admitted to the four cylinders is identical and further, since the cylinder volumes are also identical, the head plate 6 may move into its terminal position without a change of position of the end plate 4. By means of an electric switch the pump may be shut off and the filter press emptying (opening) operation may be initiated.

It is to be understood that instead of four pull rods it is feasible to provide only three pull rods, in which case the axis of at least one pull rod is at least approximately coplanar with the track plane of the guidance for the head plate and the filter plates in order to prevent a tilting of the head plate and the filter plates during the opening and closing operations. In case of very large filter plate presses it may be expedient to provide more than four hydraulic cylinders.

It will be understood that the above description of the present invention is susceptible to various modifications, changes and adaptations, and the same are intended to be comprehended within the meaning and range of equivalents of the appended claims.

What is claimed is:

1. In a plate filter press including a plurality of filter plates forming a filter plate stack having opposite ends; a machine frame including an overhead guide carrier having a guide track defining a plane and supporting the filter plates for individual displacement thereof in a direction parallel to the longitudinal axis of the plate filter press; a longitudinally displaceable head plate arranged at one end of the filter plate stack; means coupled to said guide carrier and said head plate for guiding said head plate along said guide carrier for displacing said head plate parallel to itself; an end plate arranged at the other end of the filter plate stack and unshiftably supported on the guide carrier; a power device attached to the head plate; and pull rod means having one end attached to the end plate and another end coupled to the power device for urging the end plate and the head plate towards one another by the power device for pressing the filter plates to one another in the closed state of the plate filter press; the improvement wherein said power device includes hydraulic power cylinder units each having a cylinder fixedly secured to said head plate; a piston slidably received in the respective cylinder; a piston rod attached to the respective piston and projecting from the respective cylinder; said pull rod means including a plurality of pull rods; at least two of said pull rods being upper pull rods and having their longitudinal axis lying at least approximately in said plane defined by said guide track; each said piston rod being connected to a separate one of said pull rods; a first spherical bearing connecting said guide carrier with said end plate for swivelably suspending said end plate from said guide carrier; and second spherical bearings each connecting said end plate with a separate one of said pull rods for swivelably securing said end plate to said pull rods; the center of said first spherical bearing lying in a vertically oriented single plane containing a vertical axis passing through the center of gravity of said end plate; whereby said pull rods and said hydraulic power cylinder units are free from force-transmitting connections with said machine frame for substantially isolating said machine frame from forces generated by said hydraulic power cylinder units.

2. A plate filter press as defined in claim 1, wherein the center of each said second spherical bearing lies in said vertically oriented single plane.

3. A plate filter press as defined in claim 1, further comprising a hydraulic control circuit operatively connected with said hydraulic power cylinder units for controlling closing and opening operations of the plate filter press; said hydraulic control circuit including (a) pump means for supplying pressurized hydraulic fluid to said hydraulic power cylinder units;
 (b) first conduit means interconnecting the cylinders of said unit with one another and said pump means for generating identical pressures in all said cylinders;
 (c) hydraulic fluid volume distributing means;
 (d) second conduit means connecting said pump means through said hydraulic fluid volume distributing means with said cylinders for supplying an identical volume flow to all said cylinders; and
 (e) control means connected to said pump means and said first and second conduit means; said control means having, in each closing operation, a first state in which said control means maintains communication between said pump means and all the cylinders through said second conduit means and said hydraulic fluid volume distributing means; said control means having, in each closing operation, a subsequent second state in which said control means maintains communication between said pump means and all the cylinders through said first conduit means; said control means having pressure-responsive means sensing the hydraulic pressure in said second conduit means for setting the control means from said first state into said second state when the hydraulic pressure in said second conduit means reaches a predetermined value.

4. A plate filter press as defined in claim 3, wherein said control means comprises a switch valve including said pressure-responsive means and means for adjusting the predetermined pressure to which said switch valve responds.

5. A plate filter press as defined in claim 1, wherein said means coupled to said guide carrier and said head plate comprises a carriage mounted on said guide carrier for longitudinal displacement, and means pivotally securing said head plate to said carriage.

6. A plate filter press as defined in claim 1, further comprising spring means urging said pull rod means against said second spherical bearing means.

7. A plate filter press as defined in claim 1, wherein the number of said hydraulic power cylinder units is four.

* * * * *